(12) United States Patent
Moffett

(10) Patent No.: US 8,092,736 B2
(45) Date of Patent: Jan. 10, 2012

(54) FLUOROTELOMER/SILANE COMPOSITIONS

(75) Inventor: Robert Harvey Moffett, Landenberg, PA (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 417 days.

(21) Appl. No.: 12/276,448

(22) Filed: Nov. 24, 2008

(65) Prior Publication Data

US 2010/0127426 A1    May 27, 2010

(51) Int. Cl.
*B29C 39/22* (2006.01)

(52) U.S. Cl. ........ 264/300; 526/206; 526/247; 526/253; 526/255; 526/250

(58) Field of Classification Search .......... 526/247, 526/206, 250, 253, 255; 264/300
See application file for complete search history.

(56) References Cited

U.S. PATENT DOCUMENTS

| | | | | |
|---|---|---|---|---|
| 3,067,262 | A | * 12/1962 | Brady | 570/126 |
| 5,281,455 | A | 1/1994 | Braun et al. | |
| 5,298,556 | A | 3/1994 | Stephens | |
| 5,300,613 | A | 4/1994 | Kishita et al. | |
| 5,310,870 | A | * 5/1994 | Peavy | 528/392 |
| 5,459,212 | A | * 10/1995 | Krespan et al. | 526/89 |
| 5,601,641 | A | 2/1997 | Stephens | |
| 6,515,069 | B1 | 2/2003 | Gervasi et al. | |
| 6,596,829 | B1 * | 7/2003 | Peavy | 526/250 |
| 6,613,846 | B2 | 9/2003 | Hintzer et al. | |
| 2006/0079600 | A1 * | 4/2006 | Gopalratnam et al. | 523/139 |
| 2006/0079601 | A1 * | 4/2006 | Gullo et al. | 523/139 |

FOREIGN PATENT DOCUMENTS

| | | | |
|---|---|---|---|
| JP | 1991-166281 | * | 7/1991 |
| JP | 1991166281 | A | 7/1991 |
| JP | 1993-255356 | * | 10/1993 |
| JP | 1993255356 | A | 10/1993 |
| JP | 3166281 | B2 | 11/1993 |
| JP | 1998-268679 | * | 10/1998 |
| JP | 1998268679 | A | 10/1998 |
| JP | 2005060554 | A | 3/2005 |
| JP | 2005146123 | A | 6/2005 |

* cited by examiner

*Primary Examiner* — Peter D. Mulcahy
*Assistant Examiner* — Henry Hu

(57) ABSTRACT

A composition and its use as a mold release composition are disclosed. The composition comprises a fluorotelomer, which comprises repeat units derived from a fluoroalkene, and optionally a comonomer, and has an endgroup derived from an alcohol, an alcohol derivative, or a combination thereof, and said fluorotelomer has or comprises a structure depicted as $H(CX_2)_p B_q D_r$, or a mixture of structures depicted as $H(CX_2)_p B_q$ and $H(CX_2)_p D_r$, wherein each X is independently H or F, provided at least one X is F, p is a number from about 16 to about 1500, B represents a unit derived from a hydrofluorocarbon, q is a number from 0.02 to 0.4, D represents an endgroup derived from said alcohol, alcohol derivative, or combination thereof, and r is a number 0.2 to 1.0. The composition comprises a silane having the formula $R^1_n$—Si—$(Z)_{4-n}$ wherein Z is $OR^2$, Cl, or H, wherein $R^1$ is selected from the group consisting of hydrogen, a hydrocarbon radical having 1-34 carbon atoms, and combinations of two or more thereof, $R^2$ is selected from the group consisting hydrogen, a hydrocarbon radical having 1-4 carbon atoms, and combinations of two or more thereof, provided that $R^1$ and $R^2$ both cannot be hydrogen, and n is a number from 1 to 3. The composition may further comprise a solvent and/or a catalyst.

17 Claims, No Drawings

FLUOROTELOMER/SILANE COMPOSITIONS

FIELD OF THE INVENTION

This invention relates to the field of mold release agents, especially for use in molds to produce molded objects using elastomers.

BACKGROUND OF THE INVENTION

Molds are commonly used tools used to convert a material into a given shape; the shaped material is referred to as a molded object. Examples of desired materials used for molds are elastomers, plastics, and resins. Examples of common elastomers are urethanes, natural rubber, butyl rubber, ethylene acrylic, and neoprene. Once injected into the mold, the elastomer or other material takes the shape of the mold. Molded objects often adhere tightly to the molds during this shaping process. To allow the molded object to be removed from the mold with low force and without damage to the molded object, the mold is typically coated with a release agent.

There are three main categories of release agents: sacrificial, semi-permanent, and permanent. Sacrificial release agents typically need to be applied to a mold every time a mold is used. Examples of sacrificial mold release agents include waxes, fatty acid or esters, and silicone oils. Semi-permanent release agents provide multiple releases per application. Semi-permanent release agents are typically particulate fluorocarbon materials or cured films of siloxanes. Both sacrificial and semi-permanent release agents are typically applied and repaired by a person doing the molding, commonly referred to as the "molder". Permanent release agents last longer than semi-permanent release agents and are generally a coating on the mold of a fluorocarbon polymer which is melted and applied to the mold at high temperature. Permanent release agents are applied to the mold by an outside company (company other than the molder) who has special equipment to generate the required temperatures to melt the fluoropolymer coatings. When damaged, permanent release agent coatings generally cannot be repaired by the molder. The molder must send the mold with the damaged coating to the outside company to repair the coating.

Release agents that allow the production of multiple molded objects before they must be reapplied to a mold, are desirable to increase production and decrease build-up of release agent within the mold. Release agents should also provide easy release of the molded object to avoid damage to the object as the object is removed from the mold, that is, during the "de-molding process".

Stephens discloses compositions, which allow several releases before recoating, but have relatively long lists of components. In U.S. Pat. No. 5,298,556, Stephens discloses a mold release agent comprising (1) a silane, (2) a multifunctional polydimethyl siloxane emulsified polymer, (3) a substituted nonyl or octyl phenol derivative surfactant, (4) a non-ionic surfactant, (5) a synthetic ethoxylated amine surfactant, (6) a silanol-terminated polydimethyl siloxane, (7) a low molecular weight alcohol, (8) a weak acid to maintain a pH 4.5 to 5.5, and (9) water. In U.S. Pat. No. 5,601,641, Stephens discloses a mold release agent comprising (1) a silane, (2) a methyl-terminated polydimethylsiloxane emulsified polymer, (3) a non-ionic surfactant, (4) a silanol-terminated polydimethylsiloxane, (5) a low molecular weight alcohol, (6) a fungicide, (7) a metallic salt or an organic acid, (8) a weak acid to maintain a pH 4.5 to 5.5, (9) a hydroxyl-terminated polybutadiene, and (10) water.

In U.S. Pat. No. 6,596,829, Peavy describes a release agent based upon a low molecular weight fluorotelomer that contains functional endgroups for improved bonding to the surface of a mold. The composition is crosslinked with a catalyst to form a film on a substrate. The release agent is capable of multiple releases before reapplication is needed.

Still, there remains a need for a release agent composition which allows for a greater number of releases and that can be easily applied or repaired by the molder without the need for complicated synthesis, or the use of complicated machinery, or extended down production time. The release agent should allow for multiple molding operations and low force to remove the molded object. The present invention meets these needs.

SUMMARY OF THE INVENTION

The present invention is a release agent composition comprising (a) a fluorotelomer, (b) a silane, and (c) a solvent, wherein said fluorotelomer comprises repeat units derived from a fluoroalkene, and optionally a comonomer, and has an endgroup derived from an alcohol, an alcohol derivative, or a combination thereof, and said fluorotelomer has or comprises a structure depicted as $H(CX_2)_pB_qD_r$, or a mixture of structures depicted as $H(CX_2)_pB_q$ and $H(CX_2)_pD_r$, wherein each X is independently H or F, provided at least one X is F, p is a number from about 16 to about 1500, B represents a unit derived from a hydrofluorocarbon, q is a number from 0.02 to 0.4, D represents an endgroup derived from said alcohol, alcohol derivative, or combination thereof, and r is a number 0.2 to 1.0; and wherein said silane has the formula $R^1_n$—Si—$(Z)_{4-n}$ wherein Z is $OR^2$, Cl, or H, wherein $R^1$ is selected from the group consisting of hydrogen, a hydrocarbon radical having 1-34 carbon atoms, and combinations of two or more thereof, $R^2$ is selected from the group consisting hydrogen, a hydrocarbon radical having 1-4 carbon atoms, and combinations of two or more thereof, provided that $R^1$ and $R^2$ both cannot be hydrogen, and n is a number from 1 to 3. The release agent composition may further comprise a catalyst.

This invention still further provides a process of producing a molded object comprising applying a release agent composition to a mold to coat the mold, injecting a molding material into the coated mold, curing the mold composition to produce a molded object, and removing the molded object from the mold, wherein the release agent composition comprises a fluorotelomer, a silane, and a solvent, wherein said fluorotelomer comprises repeat units derived from a fluoroalkene, and optionally a comonomer, and has an endgroup derived from an alcohol, an alcohol derivative, or a combination thereof, and said fluorotelomer has or comprises a structure depicted as $H(CX_2)_pB_qD_r$, or a mixture of structures depicted as $H(CX_2)_pB_q$ and $H(CX_2)_pD_r$, wherein each X is independently H or F, provided at least one X is F, p is a number from about 16 to about 1500, B represents a unit derived from a hydrofluorocarbon, q is a number from 0.02 to 0.4, D represents an endgroup derived from said alcohol, alcohol derivative, or combination thereof, and r is a number 0.2 to 1.0; and wherein said silane has the formula $R^1_n$—Si—$(Z)_{4-n}$ wherein Z is $OR^2$, Cl, or H, wherein $R^1$ is selected from the group consisting of hydrogen, a hydrocarbon radical having 1-34 carbon atoms, and combinations of two or more thereof, $R^2$ is selected from the group consisting hydrogen, a hydrocarbon radical having 1-4 carbon atoms, and combinations of two or more thereof, provided that $R^1$ and $R^2$ both cannot be hydrogen, and n is a number from 1 to 3.

DETAILED DESCRIPTION OF THE INVENTION

This invention provides a release agent composition comprising a fluorotelomer, a silane, and a solvent, wherein said fluorotelomer comprises repeat units derived from a fluoroalkene, and optionally a comonomer, and has an endgroup derived from an alcohol, alcohol derivative such as an ether or ester, or combination of alcohol and alcohol derivative; wherein said fluorotelomer has or comprises a structure depicted as $H(CX_2)_pB_qD_r$ or said fluorotelomer is a mixture of fluorotelomers wherein at least one fluorotelomer in the mixture has or comprises a structure depicted as $H(CX_2)_pB_q$ and at least one fluorotelomer in the mixture has or comprises a structure depicted as $H(CX_2)_pD_r$, wherein each X is independently H or F, provided at least one X is F, p is a number from about 16 to about 1500, B represents a unit derived from a hydrofluorocarbon, q is a number from 0.02 to 0.4, D represents an endgroup derived from said alcohol or alcohol derivative or combination thereof, and r is a number 0.2 to 1.0; and said silane has the formula $R^1{}_n—Si—(Z)_{4-n}$ wherein Z is $OR^2$, Cl, or H, wherein $R^1$ is selected from the group consisting of hydrogen, a hydrocarbon radical having 1-34 carbon atoms, and combinations of two or more thereof, $R^2$ is selected from the group consisting hydrogen, a hydrocarbon radical having 1 to 4 carbon atoms, and combinations of two or more thereof provided that $R^1$ and $R^2$ both cannot be hydrogen; and n is a number from 1 to 3. The release agent composition may also comprise a catalyst.

Fluorotelomer

The release agent composition of this invention comprises a fluorotelomer. The fluorotelomer comprises repeat units derived from a fluoroalkene and optionally a comonomer; has an endgroup derived from an alcohol, an alcohol derivative such as an ether or ester, or a combination thereof, and has an endgroup derived from a hydrofluorocarbon.

The fluoroalkene monomer of the fluorotelomer can be any fluoroalkene that provides a fluorotelomer, which fluorotelomer can be used as a mold release as disclosed herein. The preferred fluoroalkene monomer has 2 to about 10, preferably 2 to 3, carbon atoms. More preferably, the fluoroalkene is selected from the group consisting of 1,1-difluoroethylene, 1,2-difluoroethylene, tetrafluoroethylene (TFE), 3,3,3-trifluoropropene, and hexafluoropropylene (HFP). The most preferred fluoroalkene is TFE.

The preferred fluorotelomers are homotelomers, but a cotelomer (copolymer) containing repeat unit derived from one or more comonomers can also be used. The comonomer is generally an ethylenically unsaturated compound, which can be non-fluorinated, partially fluorinated or perfluorinated. Preferably the comonomer is a perfluorinated comonomer. The amount of repeat units derived from a comonomer can be in the range of from about 0.1 to about 10.0, preferably 0.3 to 3.0 weight % of the copolymer.

A comonomer may be selected from the group consisting of 1,1-difluoroethylene, 1,2-difluoroethylene, TFE, 3,3,3-trifluoro-propene, HFP, and combinations of two or more thereof. A comonomer may also be selected from the group consisting of ethylene, propylene, butylene, decene and combinations of two or more thereof. Most preferably, the comonomer is TFE, HFP, or a combination thereof.

The fluorotelomer has or comprises a structure depicted as $H(CX_2)_pB_qD_r$ or has or comprises a mixture of structures depicted as $H(CX_2)_pB_q$ and $H(CX_2)_pD_r$. Each X is independently H or F. Preferably at least 80%, more preferably at least 90%, and most preferably at least 99% of X is F. The subscript p is a number from about 16 to about 1500. B represents a unit derived from a hydrofluorocarbon, as described below, and q is a number from 0.02 to 0.4. For each "B" structure, there is an endgroup Y, so that the corresponding structure is $H(CX_2)_pB_qY$, wherein Y is H or F. D represents an endgroup derived from an alcohol or alcohol derivative or combination thereof as described below, and r is a number 0.2 to 1.0.

A hydrofluorocarbon is used in a process for producing the fluorotelomer of the composition as a solvent. The hydrofluorocarbon is incorporated into the fluorotelomer as group, "B". Suitable hydrofluorocarbons include, but are not limited to, any of those disclosed in U.S. Pat. No. 5,310,870, the disclosure of which is incorporated herein by reference. Examples of suitable hydrofluorocarbons include, but are not limited to, 2,3-dihydrodecafluoropentane, perfluorobutyl methyl ether, perfluorobutyl ethyl ether, 2,4-dihydrooctafluorobutane, 1,1,2,3,3,3-hexafluoropropyl methyl ether, 2-trifluoromethyl-2,3-dihydrononafluoropentane, 1,1,1,3,3-pentafluorobutane, or combinations thereof. These hydrofluorocarbons can be obtained commercially. For example, 2,3-dihydrodecafluoropentane is available from E.I. du Pont de Nemours and Company, Wilmington, Del. and perfluorobutyl methyl ether and perfluorobutyl ethyl ether are available from the 3M Company, Minneapolis, Minn.

Generally, a majority of the endgroups of the fluorotelomer are derived from an alcohol, alcohol derivative, or combination thereof, that is, the endgroup D. The alcohol can be a primary, secondary or tertiary alcohol. A suitable alcohol or derivative thereof is substantially soluble in the hydrofluorocarbons disclosed hereinabove. Preferably the alcohol has at least 3 carbon atoms, more preferably the alcohol has from 4 to about 12 carbon atoms. Alcohol derivatives include ethers and esters of an alcohol or combinations thereof. Also suitable is the combination of an alcohol, ether thereof, and/or ester thereof. Preferably the alcohol or alcohol derivative is selected from the group consisting of 1-propanol, 2-propanol, 1-butanol, 2-butanol, 1-pentanol, 2-pentanol, 1-hexanol, 2-hexanol, 1-heptanol, 2-heptanol, sec-butyl acetate, cyclohexanol, 1-methoxy-2-propanol, 1-methoxy-3-butanol, 1-methoxy-2-pentanol, 1-methoxy-2-propanol acetate ester, 2-methyl-2-butanol, and combinations of two or more thereof. More preferably the alcohol is 1-butanol, 2-butanol, 1-pentanol, 2-pentanol, or a combination thereof.

The mole ratio of the repeat units derived from the fluoroalkene to the alcohol, alcohol derivative or combination thereof may range from about 18:1 to about 500:1, preferably about 120:1 to about 150:1. The mole ratio of the repeat units derived from the fluoroalkene to the hydrofluorocarbon may range from about 800:1 to about 2500:1, preferably about 2000:1 to about 2400:1.

The fluorotelomer used in the composition of this invention preferably has a number average molecular weight in the range of from about 800 to 75,000, more preferably 3,000 to 30,000. The amount of alcohol can be between about 0.04 to about 5 mole %, preferably about 0.3 and about 5 mole %, and preferably 2.5 to 4.0 mole %, based on the total number of moles of fluoroalkene to produce a fluorotelomer of suitable molecular weight. The molar ratio of hydrofluorocarbon to fluoroalkene may range from about 1:1 to about 10:1, preferably 2:1 to 8:1. Generally, as the ratio increases, the telomer molecular weight decreases.

A description of the preparation of a fluorotelomer useful in this invention is described in detail by Peavy in U.S. Pat. No. 6,596,829, which is herein incorporated by reference in its entirety. Examples of fluorotelomers are known in the art and are commercially available, such as from E.I. du Pont de Nemours and Company, Wilmington, Del.

The fluorotelomer may be conveniently provided as a dispersion in the hydrofluorocarbon. The hydrofluorocarbon is same as used to provide group "B". The dispersion may contain from about 5 to about 30 weight % of the fluorotelomer, with dispersions of high molecular weight fluorotelomers falling at the low end of this range. If desired, the fluorotelomer, may also be provided in other solvents, such as isopropanol or in water and may also be diluted to a desired concentration.

The release agent composition comprises one or more fluorotelomers in an amount ranging from about 1 to about 10%, by weight, based on total weight of the release agent composition, more preferably from about 2 to about 6%, and most preferably from about 4 to about 5%.

Silane

The release agent composition of this invention comprises a silane having the formula $R^1_n$—Si—$(Z)_{4-n}$ wherein Z is $OR^2$ or Cl or H; wherein $R^1$ is selected from the group consisting of hydrogen, a hydrocarbon radical having 1-34 carbon atoms, and combinations of two or more thereof, $R^2$ is selected from the group consisting of hydrogen, a hydrocarbon radical having 1-4 carbon atoms, and combinations of two or more thereof, provided that $R^1$ and $R^2$ both cannot be hydrogen; and n is a number from 1 to 3.

The hydrocarbon radical of $R^1$ may be an alkyl, alkenyl, or aryl group. The alkyl and alkenyl groups can be straight-chained or branch-chained. Suitable hydrocarbon radicals for $R^1$ include methyl, ethyl, propyl, iso-propyl, butyl, iso-butyl, vinyl, allyl, phenyl, and combination of two or more thereof. The hydrocarbon radical of $R^2$ may be an alkyl group, such as methyl, ethyl, propyl, butyl, iso-propyl, iso-butyl, or a combination of two or more thereof.

Preferably the composition comprises a silane selected from the group consisting of methyltrimethoxysilane, methyltriethoxysilane, ethyltrimethoxysilane, ethyltriethoxysilane, phenyltrimethoxysilane, vinyltrimethoxysilane, octyltrimethoxysilane, dimethyldichlorosilane, methyldichlorosilane, methyltrichlorosilane, phenyltricholorosilane, trichlorosilane, trimethylchlorosilane, silicone tetrachloride, vinyltrichlorosilane, and combinations of two or more thereof.

Examples of suitable silanes are available commercially, for example, from Dow Corning, Midland, Mich., Momentive Performance Materials, Wilton, Conn., and Clearco Products, Bensalem, Pa. The silane also can be produced by any methods known to one skilled in the art.

The release agent composition comprises a silane in an amount ranging from about 0.1 to about 10% by weight, based on the total weight of the composition, preferably from about 0.2 to about 5%, on the same weight basis, and more preferably from about 0.75 to about 1.25%.

Solvent

The release agent composition comprises a solvent and is provided as a dilute dispersion. Any volatile compound that does not adversely react with other components in the release agent composition may be used. A solvent may be used to lower the viscosity of the composition to aid in applying the composition to the surface of a mold which will be in contact with the molded object. A solvent may be used, for example, to lower the viscosity of the composition sufficiently to enable the release agent composition to be sprayed onto the surface of the substrate.

The solvent may be or comprise a straight-chained or branch-chained alkane, a straight-chained or branch-chained alcohol, an alcohol-water mixture or a combination of two or more thereof. The solvent may be or comprise, for example, n-heptane, octane, nonane, isoparaffinic fluid, isopropanol, butanol, pentanol, or a combination of two or more thereof.

A solvent or combination of solvents is present in the release agent composition in an amount ranging from about 70 to about 98% by weight, based on the total weight of the release agent composition, preferably from about 80 to about 95%, and more preferably from about 90 to about 95% on the same weight basis.

Catalyst

The release agent composition may comprise a catalyst, which for purposes herein is defined as any composition that catalyzes or enhances the curing of the composition. The catalyst is preferably selected from the group consisting of compounds of titanium, zirconium, and combinations thereof. The catalyst may alternatively be selected from the group consisting of a Group VIII metal; a Group VIII metal compound, and a combination thereof. The Group VIII metal is preferably platinum, palladium, iron, zinc, rhodium, nickel, tin, or a combination of two or more thereof.

Examples of suitable titanium and zirconium compounds useful as catalysts include, but are not limited to, those having the formula $M(OR^3)_4$ where M is zirconium or titanium and each $R^3$ is independently selected from the group consisting of alkyl, cycloalkyl, and alkaryl having from about 1 to about 30, preferably from about 2 to about 18, and more preferably about 2 to about 12 carbon atoms per radical. Titanium and zirconate chelates may be used. Specific examples of titanium and zirconium catalysts include, but are not limited to, zirconium acetate, zirconium propionate, zirconium butyrate, zirconium hexanoate, zirconium 2-ethylhexanoate, zirconium octoate, tetraethyl zirconate, tetrapropyl zirconate, tetraisopropyl zirconate, tetrabutyl zirconate, titanium acetate, titanium propionate, titanium butyrate, titanium hexanoate, titanium 2-ethylhexanoate, titanium octoate, tetraethyl titanate, tetrapropyl titanate, tetraisopropyl titanate, tetrabutyl titanate, titanium bis-ammonium lactate, bis-acetylacetonate titanate, bis-ethyl acetoacetate titanate, bis-triethanolamine titanate, and a combination of two or more thereof. Preferably the catalyst is tetraethyl titanate, tetrapropyl titanate, tetraisopropyl titanate, tetrabutyl titanate, or a combination of two or more thereof. These catalysts are commercially available.

The release agent composition typically comprises about 0.01 to about 1.0% by weight of catalyst, based on the total weight of the composition. Preferably, the composition comprises 0.1 to about 0.5%, and more preferably 0.2 to 0.4%, by weight of catalyst.

The release agent composition of this invention may consist essentially of a fluorotelomer, a silane, a solvent and a catalyst, wherein each of the fluorotelomer, silane, solvent and catalyst are those defined and present in the composition in the amounts as provided hereinabove.

The release agent composition can be produced by any means known to one skilled in the art such as, for example, by combining fluorotelomer and silane, optionally combining with solvent and/or catalyst. The combining step may be performed by any means known to one skilled in the art. For example, fluorotelomer, silane, and optionally solvent and catalyst may be combined simultaneously or sequentially, in any order and mixed together at any suitable temperature, such as, from about 0° C. to about 200° C. Pressure may be increased, for example, to accommodate the temperature. Mixing should be for a sufficient period of time to effect the production of the composition, generally, from about 0.5 minute to about 10 minutes.

The release agent composition of this invention is used in a process to produce a mold comprising applying the release agent composition to a surface of a mold wherein the release agent composition is described hereinabove. The surface of the mold includes the surface which will be contacted with the material to be molded, that is, "contact surface". Preferably, as a first step, the method comprises cleaning the mold. Cleaning can be accomplished by any known means in the art. In general, as an example, cleaning consists of sand blasting or bead blasting the mold and then rinsing or consists of wiping the mold with a solvent to remove any residual elastomer or other unwanted imperfections on the mold.

The release agent composition may be applied to the contact surface of the mold by any means known to one skilled in the art such as, for example, spraying, brushing, wiping, dipping, and combination of two or more thereof. Preferably, the release agent composition is applied to produce a thin uniform layer on the contact surface of the mold.

The method further comprises curing the release agent composition after applying the composition to the contact surface of the mold. Curing provides time, temperature and pressure conditions to permit the release agent composition to develop structure and strength and may be performed by any means known to one skilled in the art. For example, curing may be performed at a temperature from ambient temperature, such as from about 25° C., to about 250° C., at a pressure suitable for the temperature, such as, for example, at atmospheric pressure, at a time of about 2 hours at lower temperature to about one second for higher temperatures. Generally, curing is performed at similar temperature and pressure to those at which the molding process will be performed.

The method produces a mold comprising a surface wherein the surface or a portion of the surface is coated with a cured release agent composition wherein the composition is described hereinabove.

This invention further provides an improved process for producing a molded object. The process comprises injecting a molding material into a mold, wherein the mold has been produced by a method comprising applying a release agent composition to a surface of a mold wherein the release agent composition is described hereinabove, and curing the release agent composition after applying the composition to the mold. More particularly, a process for producing a molded object comprises: (a) providing a release agent composition comprising a fluorotelomer, a silane, and a solvent, wherein said fluorotelomer comprises repeat units derived from a fluoroalkene, and optionally a comonomer, and has an endgroup derived from an alcohol, an alcohol derivative, or a combination thereof, wherein said fluorotelomer has or comprises a structure depicted as $H(CX_2)_pB_qD_r$, or a mixture of structures depicted as $H(CX_2)_pB_q$ and $H(CX_2)_pD_r$, wherein each X is independently H or F, provided at least one X is F, p is a number from about 16 to about 1500, B represents a unit derived from a hydrofluorocarbon, q is a number from 0.02 to 0.4, D represents an endgroup derived from said alcohol, alcohol derivative, or combination thereof, and r is a number 0.2 to 1.0; and said silane has the formula $R^1_n$—Si—$(Z)_{4-n}$ wherein Z is $OR^2$, Cl, or H, wherein $R^1$ is selected from the group consisting of hydrogen, a hydrocarbon radical having 1-34 carbon atoms, and combinations of two or more thereof, $R^2$ is selected from the group consisting hydrogen, a hydrocarbon radical having 1-4 carbon atoms, and combinations of two or more thereof, provided that $R^1$ and $R^2$ both cannot be hydrogen, and n is a number from 1 to 3; (b) applying the release agent composition to a contact surface of a mold; (c) curing the release agent composition on the mold surface; (d) injecting a molding material into the mold wherein the molding material contacts the contact surface of the mold to produce a molded object; and (e) removing the molded object from the mold.

Molding conditions of time and temperature and pressure may vary and depend on the molding material. For example, time may range from seconds to over an hour; temperature may range from 120 to 250° C. Suitable molding materials include elastomers, such as, but not limited to urethanes, natural rubber, butyl rubber, ethylene acrylic, and neoprene.

The method to produce a mold may be repeated. That is, while the present invention provides an improvement in mold release, e.g., relative to release compositions lacking both a fluorotelomer and a silane, after repeated molding and demolding operations, the contact surface of the mold may be compromised. By "compromised", it is meant to indicate any portion of release agent composition that is not uniform, is missing, is removed, is worn through, is chipped, or is rubbed off of the mold. For such compromised molds, the molder may re-apply the release agent composition in situ to the surface where the coating has been removed, worn, chipped, etc. Advantageously, there is no need to have special equipment, or to send the compromised mold to an outside company. The release agent composition may be re-applied by any coating means known to those skilled in the art including brushing, spraying, wiping, dipping and combination of two or more thereof. The re-applied coating composition is allowed to cure prior to use. Re-application of the composition may occur without the need to remove all of the existing coating prior to re-application.

EXAMPLES

Mold Release Testing Procedure

A simple, steel mold was constructed and equipped with an ALTEK force gauge (commercially available from Altek Industrial Corp., Rochester, N.Y.) to measure force, in pounds (in Newtons), required to remove an elastomer molded object from the mold after the object cured The mold was bead blasted and degreased with acetone prior to use. Each release agent composition was applied by a Preval sprayer (commercially available from Precision Valve Corp., Yonkers, N.Y.) to the mold at room temperature. The mold was then heated to 177° C. (350° F.) for a minimum of five minutes to cure the composition. For Examples 1 through 14 and Comparative Examples A through G, the elastomer (3 g, GBL-100 VITON fluoroelastomer without internal release compounds, commercially available from E.I. du Pont de Nemours and Company, Wilmington, Del.) was charged to each mold. The mold was compressed for five minutes at 177° C. (350° F.) to cure the elastomer creating a molded object which was an elastomer plug. The elastomer plug was removed from the mold using the ALTEK force gauge and the highest force measured was recorded in the Table. Without re-applying the release agent composition to the mold, the mold cavity was re-charged with fresh elastomer (3 g) and the process was repeated. A total of 10 molded objects were made with each release agent composition unless the force exceeded 10 pound-force, lbf (44 N), at which point the testing was halted for that composition, unless otherwise noted. The results for each run are compiled in the Table. For the compositions that did not exceed 10 lbf (44 N), the average of the 10 runs is also listed.

Example 1

A release composition of this invention was prepared by mixing a fluorotelomer (10.20 g, 24.5% solids, by weight, in isopropanol, based on PTFE, prepared in accordance with Example 5 of U.S. Pat. No. 6,596,829), methyltrimethoxysilane (0.50 g, DC-Z-6070, commercially available from Dow-Corning, Midland, Mich.), tetra-isopropyl titanate (0.05 g, TYZOR TPT organic titanate, commercially available from E.I. du Pont de Nemours and Company, Wilmington, Del.), and isopropanol (39.80 g, commercially available from VWR, West Chester, Pa.). Example was 1 was applied to the mold at 40° C. (104° F.).

Comparative Example A

In this Comparative Example, there is no silane or catalyst. A comparative release composition was prepared by mixing the same fluorotelomer used in Example 1 (10.20 g, 24.5% solids, by weight, in isopropanol) with isopropanol (39.80 g). Comparative Example A was applied to the mold at 40° C. (104° F.).

With respect to Release Force for Comparative Example A (see Table), there was an outlying data point, that was not included in calculating average release force for the corresponding release agent composition. Analyses for Comparative Example A, Run 10, for release force was anomalous—it was very low in comparison with all other measurements for this comparative example. Statistical analysis using the American Society for Testing Materials (ASTM) "Standard Practice for Dealing with Outlying Observations" (ASTM E-178-80, re-approved in 1989) indicated the specific measurement (Run 10, Comparative Example A) was an outlier by this statistical test, that is, there is less than 1% risk of erroneously rejecting the measurement. Skewness and kurtosis plots confirmed this conclusion. Such outlying measurements may result from random causes such as human error, loss of instrument calibration or other change in sample preparation or measurement procedure.

Comparative Example B

In this Comparative Example, there is no silane. A comparative release composition was prepared by mixing the same fluorotelomer used in Example 1 (10.20 g, 24.5% solids, by weight, in isopropanol), with tetra-isopropyl titanate (0.05 g), and isopropanol (39.80 g). Comparative Example B was applied to the mold at 40° C. (104° F.).

Comparative Example C

Example 1 was repeated using a non-functional fluorotelomer. A release composition was prepared by mixing a fluorotelomer (10.20 g, 24.5% solids, by weight, in isopropanol DRYFILM RA/IPA, available from E.I. du Pont de Nemours and Company), methyltrimethoxysilane (0.25 g, DC-Z-6070), tetra-isopropyl titanate (0.05 g), and isopropanol (39.50 g). Comparative Example C was applied to the mold at 40° C. (104° F.).

Example 2

Example 1 was repeated using methyltriethoxysilane as the silane. A release composition was prepared by mixing the fluorotelomer used in Example 1 (2.00 g, 24.5% solids, by weight, in isopropanol), methyltriethoxysilane (0.10 g, DC-Z-6370, commercially available from Dow-Corning, Midland, Mich.), tetra-isopropyl titanate (0.03 g), and isopropanol (7.87 g). Example 2 was applied to the mold at 65° C. (149° F.).

Example 3

Example 2 was repeated using octyltriethoxysilane and a zirconium catalyst. A release composition was prepared by mixing the fluorotelomer used in Example 1 (2.00 g, 24.5% solids, by weight, in isopropanol), octyltriethoxysilane (0.50 g, DC-Z-6341, commercially available from Dow-Corning, Midland, Mich.), Zirconium Hydro-Chem (0.03 g, commercially available from OMG, Franklin, Pa.), and isopropanol (7.87 g). Example 3 was applied to the mold at 65° C. (149° F.).

Example 4

Example 2 was repeated using butanol as the solvent. A release composition was prepared by mixing the fluorotelomer used in Example 1 (2.00 g, 24.5% solids, by weight, in isopropanol), methyltriethoxysilane (0.10 g, DC-Z-6370), tetra-isopropyl titanate (0.03 g), and butanol (7.87 g, commercially available from VWR, West Chester, Pa.). Example 4 was applied to the mold at 65° C. (149° F.).

Example 5

Example 2 was repeated with pentanol as the solvent. A release composition was prepared by mixing the fluorotelomer used in Example 1 (2.00 g, 24.5% solids, by weight, in isopropanol), methyltriethoxysilane (0.10 g, DC-Z-6370), tetra-isopropyl titanate (0.03 g), and pentanol (7.87 g, commercially available from VWR, West Chester, Pa.). Example 5 was applied to the mold at 65° C. (149° F.).

Example 6

Example 2 was repeated with an isoparaffinic fluid as the solvent. A release composition was prepared by mixing the fluorotelomer used in Example 1 (2.00 g, 24.5% solids, by weight, in isopropanol), methyltriethoxysilane (0.10 g, DC-Z-6370), tetra-isopropyl titanate (0.03 g), and isoparaffin (7.87 g, Isopar G, commercially available from Exxon Mobil Corp., Houston, Tex.). Example 6 was applied to the mold at 65° C. (149° F.).

Example 7

Example 5 was repeated with pentanol and water as the solvents. A release composition was prepared by mixing the fluorotelomer used in Example 1 (2.00 g, 24.5% solids, by weight, in isopropanol), methyltriethoxysilane (0.10 g, DC-Z-6370), tetra-isopropyl titanate (0.03 g), water (0.5 g), and pentanol (7.82 g,). Example 7 was applied to the mold at 65° C. (149° F.).

Comparative Example D

Example 1 was repeated with a very low silane concentration. A comparative release composition was prepared by mixing the fluorotelomer used in Example 1 (10.20 g, 24.5% solids, by weight, in isopropanol), methyltrimethoxysilane (0.03 g, DC-Z-6070), tetra-isopropyl titanate (0.05 g), and isopropanol (39.72 g). Comparative Example D was applied to the mold at 40° C. (104° F.).

Example 8

Example 1 was repeated using 0.5 times the concentration of the silane. A release composition was prepared by mixing the fluorotelomer used in Example 1 (10.20 g, 24.5% solids, by weight, in isopropanol), methyltrimethoxysilane (0.12 g, DC-Z-6070), tetra-isopropyl titanate (0.05 g), and isopropanol (39.63 g). Example 8 was applied to the mold at 40° C. (104° F.).

Example 9

Example 8 was repeated using twice the amount of the silane. A release composition was prepared by mixing the fluorotelomer used in Example 8 (10.20 g, 24.5% solids, by weight, in isopropanol) methyltrimethoxysilane (0.25 g, DC-Z-6070), tetra-isopropyl titanate (0.05 g), and isopropanol (39.50 g). Example 9 was applied to the mold at 40° C. (104° F.).

Example 10

Example 9 was repeated using double the amount of the silane. A release composition was prepared by mixing the fluorotelomer used in Example 1 (10.20 g, 24.5% solids, by weight, in isopropanol), methyltrimethoxysilane (0.50 g, DC-Z-6070), tetra-isopropyl titanate (0.05 g), and isopropanol (39.23 g). Example 10 was applied to the mold at 40° C. (104° F.).

Example 11

Example 3 was repeated as a diluted composition. A release composition was prepared by mixing the fluorotelomer used in Example 3 (0.82 g, 24.5% solids, by weight, in isopropanol), octyltriethoxysilane (0.04 g, DC-Z-6341), tetra-isopropyl titanate (0.01 g), and isopropanol (9.13 g). Example 11 was applied to the mold at 65° C. (149° F.).

Comparative Example E

Example 2 was repeated using a silane outside of the invention. A comparative release composition was prepared by mixing the fluorotelomer used in Example 1 (2.00 g, 24.5% solids, by weight, in isopropanol), vinyl triacetoxysilane (0.1 g, Z-6075, commercially available from Dow-Corning, Midland, Mich.), tetra-isopropyl titanate (0.03 g), and isopropanol (7.87 g). Comparative Example E was applied to the mold at 65° C. (149° F.).

Comparative Example F

Example 2 was repeated using a silane outside of the invention. A comparative release composition was prepared by mixing the fluorotelomer used in Example 1 (2.00 g, 24.5% solids, by weight, in isopropanol), aminoethyl-aminopropyl-trimethoxysilane (0.1 g, Z-6020, commercially available from Dow-Corning, Midland, Mich.), tetra-isopropyl titanate (0.03 g), and isopropanol (7.87 g). Comparative Example F was applied to the mold at 65° C. (149° F.).

Example 12

Example 1 was repeated and applied at a higher mold temperature. A release composition was prepared by mixing the fluorotelomer used in Example 1 (10.2 g, 24.5% solids, by weight, in isopropanol), methyltrimethoxysilane (0.50 g, DC-Z-6070), tetra-isopropyl titanate (0.05 g), and isopropanol (39.23 g). Example 12 was applied to the mold at 65° C. (149° F.).

Example 13

Example 1 was repeated using vinyltrimethoxysilane as the silane. A release composition was prepared by mixing the fluorotelomer used in Example 1 (2.00 g, 24.5% solids, by weight, in isopropanol), vinyltrimethoxysilane (0.10 g, Z-6300, available from Dow-Corning, Midland, Mich.), tetra-isopropyl titanate (0.03 g), and isopropanol (7.87 g). Example 13 was applied to the mold at 65° C. (149° F.).

Example 14

The molding procedure stated earlier was repeated, except polyisobutylene (2.8 g, butyl rubber, commercially available from Bayer Material Science, Pittsburgh, Pa.) was used instead of VITON to form the mold.

A release composition was prepared by mixing the fluorotelomer used in Example 1 (2.00 g, 24.5% solids, by weight, in isopropanol), octyltriethoxysilane (0.10 g, DC-Z-6341), tetra-isopropyl titanate (0.03 g), and isopropanol (7.87 g). Example 14 was applied to the mold at 65° C. (149° F.).

Example 15

Example 1 was repeated using phenyltrimethoxysilane as the silane and triethanolamine titanate as the catalyst. A release composition was prepared by mixing the fluorotelomer used in Example 1 (4.0 g, 24.5% solids, by weight, in isopropanol), phenyltrimethoxysilane (0.20 g, Z-6124, commercially available from Dow-Corning, Midland, Mich.), triethanolamine titanate (0.076 g TYZOR TE, commercially available from E.I. du Pont de Nemours and Company, Wilmington, Del.), and isopropanol (15.72 g). Example 16 was applied to the mold at 65° C. (149° F.).

RESULTS

The Examples and Comparative Examples were tested using the Mold Release Testing Procedure. Results are provided in the Table.

The release agent compositions prepared according to the Examples provided multiple releases with low force required to remove the molded elastomer object from the mold treated with the compositions of the Examples. By using release agent compositions according to the invention to treat the mold, the force required to remove the molded object from the treated mold was decreased to below 5 lbf (22 N). In comparison, similar release agent compositions of the Comparative Examples required higher force to remove the molded object and/or did not provide as many releases relative to the Example compositions.

TABLE

| | Release Force, lbf (Newtons) | | | | | | | | | | |
|---|---|---|---|---|---|---|---|---|---|---|---|
| Example | Run 1 | Run 2 | Run 3 | Run 4 | Run 5 | Run 6 | Run 7 | Run 8 | Run 9 | Run 10 | Avg |
| 1 | 1.4 (6.2) | 1.9 (8.4) | 2.2 (9.8) | 3.4 (15) | 4.1 (18) | 4.3 (19) | 3.9 (17) | 4.4 (19) | 4.2 (19) | 3.9 (17) | 3.4 (15) |
| Comp. A | 5.3 (24) | 6.2 (28) | 6.5 (29) | 6.8 (30) | 6.2 (28) | 6.6 (29) | 6.8 (30) | 6.9 (30) | 6.6 (29) | 1.1 (4.9)(a) | 6.4 (28) |
| Comp. B | 3.4 (15) | 4.2 (19) | 5.1 (23) | 5.8 (26) | 5.6 (25) | 5.9 (26) | 5.4 (24) | 6.1 (27) | 5.9 (26) | 6.2 (28) | 5.4 (24) |
| Comp. C | 6.7 (30) | 7.1 (32) | 8.9 (40) | 6.0 (27) | 8.0 (36) | 7.8 (35) | 9.5 (42) | 10.1 (45) | — | — | 2.8 (12) |
| 2 | 1.8 (8.0) | 3.5 (16) | 2.7 (12) | 2.4 (11) | 2.3 (10) | 2.9 (13) | 2.1 (9.3) | 3.5 (16) | 3.9 (17) | 3.0 (13) | 2.8 (12) |
| 3 | 1.9 (8.4) | 1.8 (8.0) | 3.7 (16) | 3.1 (14) | 1.8 (8.0) | 3.4 (15) | 2.3 (10) | 3.8 (17) | 2.6 (12) | 1.8 (8.0) | 2.6 (12) |
| 4 | 1.8 (8.0) | 2.6 (12) | 2.2 (9.8) | 2.9 (13) | 3.5 (16) | 1.9 (8.4) | 3.5 (16) | 2.8 (12) | 1.0 (4.4) | 2.0 (8.9) | 2.4 (11) |
| 5 | 2.8 (12) | 3.1 (14) | 1.2 (5.3) | 3.1 (14) | 2.2 (9.8) | 2.9 (13) | 2.1 (9.3) | 3.3 (15) | 3.3 (15) | 2.2 (9.8) | 2.6 (12) |
| 6 | 3.1 (14) | 2.5 (11) | 3.7 (16) | 2.2 (9.8) | 4.0 (18) | 3.1 (14) | 2.2 (9.8) | 4.9 (22) | 2.1 (9.3) | 4.6 (20) | 3.2 (14) |
| 7 | 2.8 (12) | 1.9 (8.4) | 2.1 (9.3) | 2.7 (12) | 2.4 (11) | 2.4 (11) | 1.9 (8.4) | 2.3 (10) | 3.2 (14) | 2.7 (12) | 2.4 (11) |
| Comp. D | 3.5 (15) | 4.4 (20) | 4.7 (21) | 5.6 (25) | 6.1 (27) | 6.9 (30) | 7.4 (33) | 7.6 (34) | 8.2 (36) | 8.0 (36) | 6.2 (28) |
| 8 | 2.4 (11) | 2.9 (13) | 3.1 (14) | 3.8 (17) | 4.2 (19) | 4.9 (22) | 4.8 (21) | 5.5 (24) | 5.8 (26) | 6.3 (28) | 4.4 (19) |
| 9 | 2.1 (9.3) | 2.5 (11) | 2.9 (13) | 3.2 (14) | 3.1 (14) | 3.5 (16) | 4.2 (19) | 4.7 (21) | 3.9 (17) | 4.8 (21) | 3.5 (16) |
| 10 | 1.4 (6.2) | 1.9 (8.4) | 2.2 (9.8) | 3.4 (15) | 4.1 (18) | 4.3 (19) | 3.9 (17) | 4.4 (20) | 4.2 (19) | 3.9 (17) | 3.4 (15) |
| 11 | 2.6 (12) | 2.9 (13) | 1.5 (6.7) | 2.9 (13) | 2.9 (13) | 1.5 (6.7) | 1.7 (7.6) | 2.3 (10) | 1.7 (7.6) | 1.2 (5.3) | 2.1 (9.3) |
| Comp. E | 5.7 (25) | 6.4 (28) | 6.8 (30) | 5.1 (23) | 10 (44) | 10 (44) | — | — | — | — | — |
| Comp. F | 10 (44) | — | — | — | — | — | — | — | — | — | — |
| 12 | 1.1 (4.9) | 1.9 (8.4) | 2.7 (12) | 3.8 (17) | 2.9 (13) | 4.2 (19) | 3.8 (17) | 3.9 (17) | 4.3 (19) | 5.1 (23) | 3.4 (15) |
| 13 | 4.3 (19) | 4.5 (20) | 4.7 (21) | 3.7 (16) | 4.3 (19) | 4.0 (18) | 4.5 (20) | 6.7 (30) | 5.9 (26) | 5.3 (24) | 4.8 (21) |
| 14 | 1.5 (6.7) | 3.2 (14) | 3.2 (14) | 1.1 (4.9) | 3.2 (14) | 1.9 (8.4) | 3.2 (14) | 1.2 (5.3) | 3.6 (16) | 3.2 (14) | 2.5 (11) |
| 15(b) | 1.8 (8.0) | 1.1 (4.9) | 2.4 (11) | 1.4 (6.2) | 1.3 (5.8) | 1.6 (7.1) | n/a | n/a | n/a | n/a | 1.6 (7.1) |

(a)For the calculation of average Release Force for Comparative Example A, Run 10 was not used.
(b)Only 6 runs were performed and the average of the six runs are reported.

What is claimed is:

1. A release agent composition comprising (a) a fluorotelomer, (b) a silane, and (c) a solvent, wherein said fluorotelomer comprises repeat units derived from a fluoroalkene, and optionally a comonomer, and has an endgroup derived from an alcohol, an alcohol derivative, or a combination thereof, and said fluorotelomer has or comprises a structure depicted as $H(CX_2)_pB_qD_r$, or a mixture of structures depicted as $H(CX_2)_pB_q$ and $H(CX_2)_pD_r$, wherein each X is independently H or F, provided at least one X is F, p is a number from about 16 to about 1500, B represents a unit derived from a hydrofluorocarbon, q is a number from 0.02 to 0.4, D represents an endgroup derived from said alcohol, alcohol derivative, or combination thereof, and r is a number 0.2 to 1.0; and wherein said silane has the formula $R^1{}_n$—Si—$(Z)_{4-n}$ wherein Z is $OR^2$, Cl, or H, wherein $R^1$ is selected from the group consisting of hydrogen, a hydrocarbon radical having 1-34 carbon atoms, and combinations of two or more thereof, $R^2$ is selected from the group consisting hydrogen, a hydrocarbon radical having 1-4 carbon atoms, and combinations of two or more thereof, provided that $R^1$ and $R^2$ both cannot be hydrogen, and n is a number from 1 to 3.

2. The composition of claim 1 wherein the fluoroalkene has 2 to about 10 carbon atoms.

3. The composition of claim 2 wherein the fluoroalkene is selected from the group consisting of 1,1-difluoroethylene, 1,2-difluoroethylene, tetrafluoroethylene (TFE), 3,3,3-trifluoropropene, and hexafluoropropylene (HFP).

4. The composition of claim 3 wherein the fluoroalkene is tetrafluoroethylene.

5. The composition of claim 1 wherein the alcohol or alcohol derivative has from 4 to about 12 carbon atoms.

6. The composition of claim 1 wherein the alcohol or alcohol derivative is selected from the group consisting of 1-propanol, 2-propanol, 1-butanol, 2-butanol, 1-pentanol, 2-pentanol, 1-hexanol, 2-hexanol, 1-heptanol, 2-heptanol, sec-butyl acetate, cyclohexanol, 1-methoxy-2-propanol, 1-methoxy-3-butanol, 1-methoxy-2-pentanol, 1-methoxy-2-propanol acetate ester, 2-methyl-2-butanol, and combinations of two or more thereof.

7. The composition of claim 1 wherein $R^1$ is selected from the group consisting of methyl, ethyl, propyl, iso-propyl, butyl, iso-butyl, vinyl, allyl, phenyl, and combination of two or more thereof.

8. The composition of claim 1 wherein $R^2$ is selected from the group consisting of methyl, ethyl, propyl, butyl, iso-propyl, iso-butyl, or a combination of two or more thereof.

9. The composition of claim 1 wherein the silane is selected from the group consisting of methyltrimethoxysilane, methyltriethoxysilane, ethyltrimethoxysilane, ethyltriethoxysilane, phenyltrimethoxysilane, vinyltrimethoxysilane, octyltrimethoxysilane, dimethyldichlorosilane, methyldichlorosilane, methyltrichlorosilane, phenyltricholorosilane, trichlorosilane, trimethylchlorosilane, silicone tetrachloride, vinyltrichlorosilane, and combinations of two or more thereof.

10. The composition of claim 1 wherein the solvent is selected from the group consisting of n-heptane, octane, nonane, isoparaffinic fluid, isopropanol, butanol, pentanol, or a combination of two or more thereof.

11. The composition of claim 10 further comprising a catalyst.

12. The composition of claim 11 wherein the catalyst is selected from the group consisting of zirconium acetate, zirconium propionate, zirconium butyrate, zirconium hexanoate, zirconium 2-ethylhexanoate, zirconium octoate, tetraethyl zirconate, tetrapropyl zirconate, tetraisopropyl zirconate, tetrabutyl zirconate, titanium acetate, titanium propionate, titanium butyrate, titanium hexanoate, titanium 2-ethylhexanoate, titanium octoate, tetraethyl titanate, tetrapropyl titanate, tetraisopropyl titanate, tetrabutyl titanate, titanium bis-ammonium lactate, bis-acetylacetonate titanate, bis-ethyl acetoacetate titanate, bis-triethanolamine titanate, and a combination of two or more thereof.

13. The composition of claim 12 wherein the composition comprises 1 to 10%, by weight of fluorotelomer, based on the total weight of the composition.

14. The composition of claim 13 wherein the composition comprises about 0.1 to about 10% by weight of silane, based on the total weight of the composition.

15. The composition of claim 14, wherein the composition comprises about 70 to 98%, by weight, of the total composition.

16. The composition of claim 15, wherein the composition comprises about 0.01 to about 1.0% by weight of catalyst, based on the total weight of the composition.

17. The composition of claim 16 wherein the fluoroalkene is tetrafluoroethylene, B is derived from a hydrofluorocarbon selected from the group consisting of 2,3-dihydrodecafluoropentane, perfluorobutyl methyl ether, perfluorobutyl ethyl ether, 2,4-dihydrooctafluorobutane, 1,1,2,3,3,3-hexafluoropropyl methy ether, 2-trifluoromethyl-2,3-dihydrononafluoropentane, 1,1,1,3,3-pentafluorobutane, and combinations thereof; the endgroup of the fluorotelomer is derived from an alcohol selected from the group consisting of 1-butanol, 2-butanol, 1-pentanol, 2-pentanol, and a combination thereof, the silane is selected from the group consisting of methyltrimethoxysilane, methyltriethoxysilane, ethyltrimethoxysilane, ethyltriethoxysilane, phenyltrimethoxysilane, vinyltrimethoxysilane, octyltrimethoxysilane, dimethyldichlorosilane, methyldichlorosilane, methyltrichlorosilane, phenyltricholorosilane, trichlorosilane, trimethylchlorosilane, silicone tetrachloride, vinyltrichlorosilane, and combinations of two or more thereof; the solvent is selected from the group consisting of n-heptane, octane, nonane, isoparaffinic fluid, isopropanol, butanol, pentanol, and a combination of two or more thereof; and the catalyst is selected from the group consisting of tetraethyl titanate, tetrapropyl titanate, tetraisopropyl titanate, tetrabutyl titanate, and a combination of two or more thereof.

* * * * *